United States Patent [19]

Couchoud et al.

[11] 4,214,069

[45] Jul. 22, 1980

[54] FLAME-RESISTANT COPOLYESTERS CONTAINING PHOSPHONIC GROUPS

[75] Inventors: Paul Couchoud, Dardilly; Yves Vaginay, Lyons, both of France

[73] Assignee: Rhone-Poulenc-Textile, Paris, France

[21] Appl. No.: 841,439

[22] Filed: Oct. 12, 1977

[30] Foreign Application Priority Data

Oct. 15, 1976 [FR] France .................. 76 31319
Dec. 29, 1976 [FR] France .................. 76 39701

[51] Int. Cl.$^2$ .................. C08G 63/18; C08G 63/68
[52] U.S. Cl. .................. 528/167; 528/169; 528/277; 528/279; 528/285; 528/287
[58] Field of Search .................. 260/47 C, 47 P, 49, 260/75 P, 75 S; 528/167, 169, 287, 277, 279, 285

[56] References Cited

U.S. PATENT DOCUMENTS

| | | | |
|---|---|---|---|
| 3,036,044 | 5/1962 | Browne et al. | 260/75 |
| 3,052,653 | 9/1962 | Iannicelli | 260/75 |
| 3,941,752 | 3/1976 | Kleiner et al. | 260/75 P |
| 4,033,936 | 7/1977 | Bollert et al. | 260/75 P |

*Primary Examiner*—Lester L. Lee
*Attorney, Agent, or Firm*—Stevens, Davis, Miller & Mosher

[57] ABSTRACT

Flame-resistant copolyesters are disclosed consisting or consisting essentially of from 85 to 99.5% of repeating units of the formula —CO—R—CO—O—R$_1$—O— in which R is a divalent aromatic radical and R$_1$ is a divalent aliphatic, cycloalkane radical or a mixture of two or several of these radicals; and least 0.5% of units of the formula:

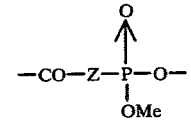

in which Me represents a metal such as Na, K, Ca or Zn, and Z represents a paraphenylene group or a divalent aliphatic grouping which contains from 1 to 18 carbon atoms, and may comprise heteroatoms, and is optionally branched, the branch being an aliphatic radical which may be halogenated, and comprises from 1 to 6 carbon atoms; and from 0 to 14.5% of units produced from a brominated compound of the formula:

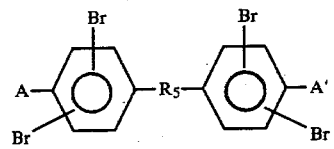

in which R$_5$ is zero or represents a grouping:

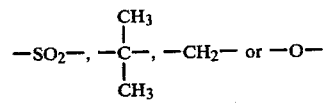

and A and A' represent either —CO—OX groups, where X=H or a lower alkyl group, or —X'OH groups, where X'=a(OCH$_2$—CH$_2$)$_n$ group, and n=1 to 10. These copolyesters may advantageously be used for producing textile threads, fibers and films.

12 Claims, No Drawings

FLAME-RESISTANT COPOLYESTERS CONTAINING PHOSPHONIC GROUPS

The present invention relates to high molecular weight flame-resistant copolyesters, which can be spun and made into a film and which contain aromatic or aliphatic phosphonic groups. It also relates to the process for obtaining flame-resistant copolyesters of this kind, as well as to the shaped articles obtained from such compounds.

According to French Pat. No. 2,176,121, it is known to prepare flame-resistant copolyesters produced from a diol, a dicarboxylic acid or its diester, and from 1 to 20 mol % of a brominated diol of the general formula:

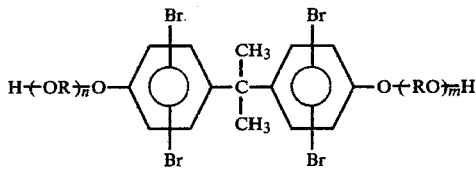

in which R is a divalent hydrocarbon radical containing from 2 to 6 carbon atoms, and n and m are integers from 1 to 10. However, in order to obtain sufficient fireproofing of the copolyesters prepared in this way compounds of this kind must be introduced in fairly large proportions, which detracts from the textile properties of the threads produced from these copolyesters.

Moreover, according to Belgian Pat. No. 568,816, it is known to improve the dyeing affinity of the polyesters towards basic dyes by the introduction of alkali metal or alkaline earth metal cations associated with anions such as carboxylate, sulphonate, phosphonate or phosphinate, having a sufficient heat stability. More particularly, according to this Belgian patent it is known to introduce monofunctional units of the formula (1) such as:

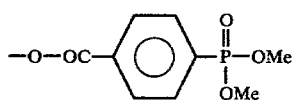

or difunctional units of the formula (2) such as:

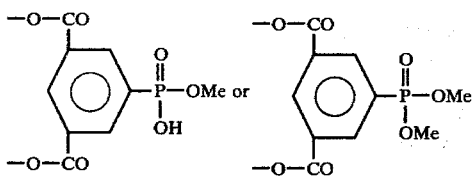

in which Me is an alkali metal.

However, because they are monofunctional the units of formula (1) can be attached only at the end of the macromolecular chains, and this limits the amount of phosphorus which can be introduced and tends to limit the length of the chains and the molecular weight of the polyesters prepared in this way.

The units of formula (2), whether they are monometal or di-metal units, as is apparent from Examples X and XI of the Belgian patent, cause significant insolubility of the copolymer prepared in this way, due to a partial decomposition of the phosphonate. Moreover, according to the French Patent Application published under No. 2,297,890 it is also known to prepare fire-resistant polyesters produced from an aromatic diacid or a derivative from which a corresponding ester is formed, from a diol or a derivative from which a corresponding ester is formed, and from at least one phosphorus compound of the formula such as:

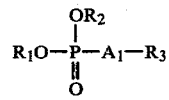

in which $R_1$ and $R_2$, which may be identical or different, represent a hydrogen atom or a hydrocarbon radical comprising from 1 to 18 carbon atoms, $R_1$ and $R_2$ together being capable of forming a ring, and $R_3$ represents a functional group, from which an ester is formed, chosen from amongst those of the formula —COOR$_5$ and —OR$_5$ (where $R_5$ = a hydrogen atom or a hydrocarbon radical comprising from 1 to 12 carbon atoms and which may contain at least one hydroxyl radical), and $A_1$ represents a divalent hydrocarbon radical comprising from 1 to 12 carbon atoms.

However, the copolyesters obtained in this way tend to cross-link in the course of polycondensation and give rise to threads which are difficult to draw and to use in the textile field.

Flame-resistant copolyesters have now been found which can be spun and made into a film, and which consist or consist essentially of from 85 to 99.5% of repeating units of the formula:

in which R is a divalent aromatic paraphenylene or 2,6-naphthylene radical, which can be replaced, to the extent of at most 19.5 mol %, relative to the sum of the radicals R, by another aromatic radical such as the metaphenylene group or by an aliphatic radical comprising from 6 to 12 carbon atoms, and optionally to the extent of at most 2 mol % by a trifunctional or tetrafunctional radical, and in which $R_1$ is a divalent aliphatic, cycloalkane radical, or a mixture of two or several of these trifunctional and tetrafunctional radicals, which may be replaced by at most 2 mol % of a trifunctional or tetrafunctional radical, provided that the sum of the trifunctional and tetrafunctional radicals R and $R_1$ does not exceed from 0 to 2 mol % relative to all of the acid reactants, at least 0.5% of units of the formula:

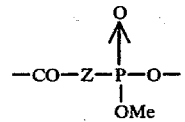

in which Me represents a metal such as Na, K, Ca or Zn, and Z represents the paraphenylene group or a divalent aliphatic grouping which comprises from 1 to 18 carbon atoms, and may comprise heteroatoms, and is optionally branched, the branch being an aliphatic radical which may be halogenated, and comprises from 1 to 6 carbon atoms, and from 0 to 14.5% of units derived from a brominated compound of the formula:

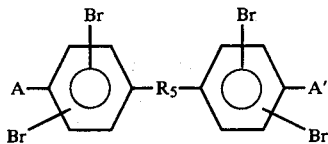

in which R$_5$ is zero or represents a grouping

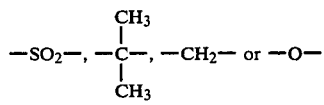

and A and A' represent either —CO—OX groups, where X=H or a lower alkyl group, or —X'OH groups, where X'=$+$OCH$_2$—CH$_2$$+_n$, and n=1 to 10.

The present invention also relates to a process for obtaining the said flame-resistant copolyesters by the reaction of from 80 to 99.5 mol %, relative to all of the acid reactants, of an aromatic diacid such as terephthalic acid or 2,6-naphthalene-dicarboxylic acid; from 0 to 19.5 mol %, relative to all of the acid reactants, of another aromatic diacid such as isophthalic acid or of an aliphatic acid comprising from 6 to 12 carbon atoms; from 85.5 to 100 mol %, relative to all of the acid reactants, of one or more aliphatic, cycloalkane diols; and, added at any time during the reaction, from 0 to 2 mol %, relative to all of the acid reactants, of a trifunctional or tetrafunctional branching agent of acid or alcohol character, in the presence of known catalysts; at least 0.5 mol %, relative to all of the diacids, of a product of the general formula:

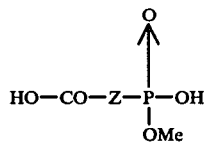

in which Me and Z have the same meanings as above; and from 0 to 14.5 mol %, relative to all of the acid reactants, of a brominated compound of the general formula:

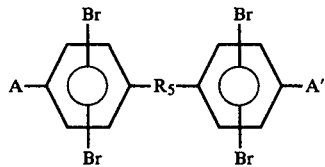

in which R$_5$ is zero or represents a grouping

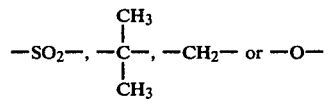

and A and A' and —CO—OH or —X'—OH groups, X' representing a $+$OCH$_2$CH$_2$$+_n$ group, where n=1 to 10.

A further process for obtaining flame-resistant copolyesters according to the present invention consists or consists essentially in carrying out an interchange between from 80° to 99.5 mol %, relative to all of the acid or ester reactants, of a lower alkyl diester of an aromatic diacid such as terephthalic acid or 2,6-naphthalenedicarboxylic acid; from 0 to 19.5 mol %, relative to all of the acid or ester reactants, of another lower alkyl diester of another aromatic diacid, such as isophthalic acid, or of an aliphatic diacid comprising from 6 to 12 carbon atoms; from 85.5 to 100 mol %, relative to all of the acid or ester reactants, of one or more aliphatic, cycloalkane diols; from 0 to 2 mol %, relative to all of the acid or ester reactants, of a trifunctional or tetrafunctional branching agent of acid, ester or alcohol character; at least 0.5 mol %, relative to all of the diesters, of a product of the general formula:

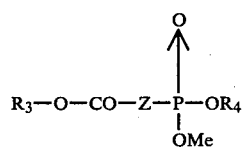

in which Z and Me have the same meanings as above, and R$_3$ and R$_4$ represent a lower alkyl radical or H; and from 0 to 14.5 mol %, relative to all of the acid or ester reactants, of a brominated compound of the general formula:

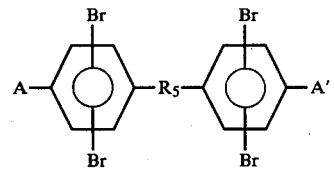

in which R$_5$ is zero or represents a group:

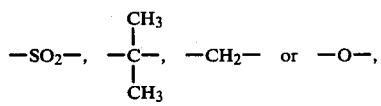

and A and A' are either —CO—OX groups, X representing a lower alkyl group or H, or —X'OH groups, where X'=a $+$ O—CH$_2$—CH$_2$$+_n$ group, and n=1 to 10; followed by polycondensation in the usual manner, in the presence of known catalysts, the non-phosphorus-containing ester compounds being added at the start of the interchange, the phosphorus-containing ester compounds being added during the interchange, preferably at the end, the acid compounds being added after the interchange, and the diol compounds being added at any time during the process.

Finally, the present invention also relates to the textile articles such as threads, fibers or films obtained from the said flame-resistant copolyesters.

The direct esterification process starting from a diacid is carried out at a temperature of at least 220° C. under a pressure above or equal to that which is necessary to maintain the glycol in the liquid state in the presence of known catalysts.

In the second process, which is carried out starting from lower alkyl diesters, the interchange of the esters is carried out at a temperature of at least 150° C., in the presence of known catalysts, and then, after addition of the acid and/or diol compounds, the reaction mixture is placed under a progressively higher vacuum whilst the temperature is increased to at least 265° C.

In both types of processes, the phosphorus-containing and brominated compounds are added in the form of a solution in the glycol.

Amongst the aromatic diacids, that which is most commonly used for economic reasons is terephthalic acid and, amongst the other aromatic or aliphatic diacids which may be used in mixtures in amounts up to 19.5 mol % relative to all of the diacids, there may be mentioned isophthalic acid, sebacic acid, adipic acid, and the like.

The preferred diol is ethylene glycol but other diols may be used in mixtures, in particular cyclohexanedimethanol, hexane-1,6-diol, butane-1,4-diol, and the like.

Branching agents of acid, alcohol or alkyl ester character may be added to the extent of from 0 to 2 mol %. These include, for example, trifunctional or tetrafunctional compounds such as trimellitic acid, trimesic acid, trimethylol propane, pentaerythritol, and the like. The carboxyphosphonic acids or their diesters are preferably used in the form of the mono-sodium or mono-potassium salt; the preferred amounts for obtaining good flame-proofing depend on the proportion of brominated compound; they are generally between 2 and 10 mol %.

Amongst the brominated compounds the brominated diols and, in particular, the diol of the formula:

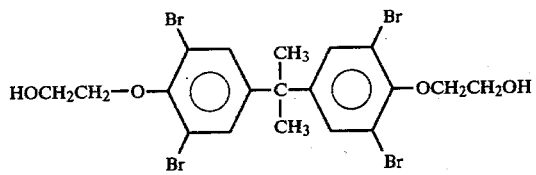

are preferred. The preferred amount of brominated compound is generally between 2 and 8 mol %.

The simultaneous presence of the phosphorus-containing compound and the brominated compound makes it possible to obtain copolyesters which are completely flame-resistant and, in particular, much more flame-resistant than if only one of the two were used, but in an amount corresponding to the sum of the amounts of each of them.

More particularly, a textile sample containing the phosphorus-containing compound or the brominated compound may exhibit a certain improvement in its fire-resistance, for example in the LOI test, whereas its combustion is total when it is submitted to the former AATCC 34-69 test, which is not the case with the samples containing the phosphorus-containing compound and the brominated compound simultaneously.

The aliphatic phosphorus-containing compounds used according to the present application have the advantage that they can be synthesized more easily and especially in a fairly troublefree manner.

On the other hand, the phenylphosphonic compounds have high stability to hydrolysis.

Compared to French patent application No. 2,297,890 of TOYO BOSEKI, the compounds according to the present invention have the advantage of imparting to the polyesters a good dyeing affinity towards basic dyes.

The copolyesters according to the present invention may be made into a film and spun in the usual manner in the molten state, and they may be drawn according to processes which are well known to those skilled in the art. The threads and films which are produced from them possess excellent flame-proofing, in particular when they contain both a phosphorus-containing compound and a brominated compound. The threads obtained in this way find a broad textile application in the field of hosiery and weaving, either by themselves or in mixtures with other natural, artificial or synthetic threads or fibers.

The examples which follow, in which the parts are understood to be by weight except when indicated to the contrary, are given by way of example, and without implying any limitation, in order still better to illustrate the invention.

The viscosity index is determined from the solution viscosity, measured at 25° C. in orthochlorophenol, by the formula:

$$V.I. = \frac{\text{specific viscosity} \times 1000}{\text{concentration}}$$

in which the concentration is expressed in $g/100 \text{ cm}^3$. In the examples which follow, the concentration is 1 $g/100 \text{ cm}^3$.

The flame-proofing tests used are the following:
the former AATCC 34/69 test,
the LOI index (limiting concentration of oxygen for combustion) according to Standard Specification ASTM B 2863-70, relating to plastic test-pieces, modified and adapted to textile samples of dimensions 5×15 cm mounted on a rectangular frame, and
the LCH flammability meter which corresponds to Standard Specification AFNOR G 07-113.

EXAMPLE 1

(a) Preparation of sodium acid β-carboxyethylphosphonate of the formula

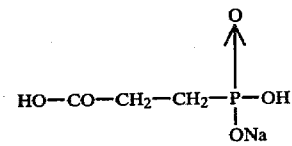

7.96 parts of β-carboxyethylphosphonic acid are neutralized by 4.24 parts of sodium acetate in 50 ml of glycol, and the mixture is heated until the glycol distills (solution 1).

(b) Preparation of the copolyester 353 parts of dimethyl terephthalate, 310 parts of ethylene glycol, 0.16 parts of antimony trioxide, and 0.19 parts of manganese acetate are introduced into a reactor equipped with the usual means of heating and regulation. The mixture is heated for 1 hour 50 minutes to 207° C., with distillation of methanol, and then to 257° C. over a period of 1 hour, with distillation of glycol.

10.2 parts of a 0.7% strength solution of phosphorous acid in glycol, the solution (1), and 43.5 parts of a diol of the formula:

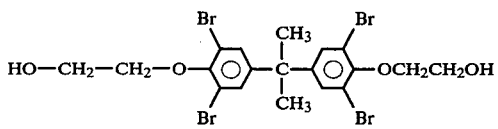

are then added. The reaction mixture is then placed under a progressively higher vacuum and the polycondensation is carried out for 25 minutes at 275° C. under 1 mm Hg.

The copolyester obtained contains 0.4% of phosphorus and 5.5% of bromine. It has a viscosity index V.I.=480.

The copolyester is spun, drawn, and treated in the usual manner.

The AATCC 34/69 and LOI frame-proofing tests are given in the table below, in comparison with a copolyester which is unmodified by the phosphorus-containing compound but spun and treated in an identical manner:

|  | LOI | AATCC 34/69 |
| --- | --- | --- |
| without phosphorus-containing diacid | 0 % P<br>5.5 % Br | 25 complete combustion |
| according to this invention | 0.4 % P<br>5.5 % Br | 27 height destroyed: 10 cm |

EXAMPLE 2

A—Preparation of the mono-potassium salt of p-carboxyphenylphosphonic acid.

25 parts of p-carboxyphenylphosphonic acid are dissolved at 160° C. in 75 parts of glycol, this temperature being maintained for 10 minutes, and then 7 parts of potassium hydroxide dissolved in the minimum amount of water are added to the mixture.

B—The following are introduced into a reactor equipped with the usual means of heating and regulation 388 parts of dimethyl terephthalate, 310 parts of glycol, 0.188 part of manganese acetate, 0.274 part of sodium acetate, and 0.093 part of antimony trioxide. The interchange of the alcohols starts at 163° C. The methanol, which is formed in the theoretical amount, is removed over a period of 1 hour 15 minutes whilst the temperature is 214° C.

When the temperature reaches 225° C., 10.2 parts of a 0.7% strength glycolic solution of phosphorous acid are added.

When the temperature reaches 230° C., 25 parts of paracarboxyphenylphosphonic acid are added in the form of the monopotassium salt of the formula:

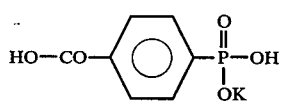

(6 mol %)

prepared as indicated above.

When the temperature of the reaction mixture reaches 250° C., a progressively higher vacuum is applied over a period of 30 minutes and the polycondensation is carried out over a period of 15 minutes under 1.2 mm Hg at 287° C.

The polymer obtained in this way possesses the following characteristics:

| Viscosity index (V.I.) | 395 |
| --- | --- |
| Viscosity in the molten state at 290° C. | 1,500 poises |
| Softening point | 248.6° C. |
| Percentage of phosphorus | 0.9% |

The polyester obtained in this way is spun through a spinneret possessing 23 holes each of diameter 0.34 mm, maintained at 260° C. The filaments obtained in this way are drawn in a ratio of 3.5 X on a heated finger at 80° C., and then on a heated plate at 120° C.

A thread of this kind shows a significant improvement in the LOI test in comparison with the same polyester which is unmodified.

EXAMPLE 3

3,320 parts of terephthalic acid, 1,620 parts of ethylene glycol, 2.74 parts of sodium acetate, 0.15 part of titanium aminotriethanolate, 0.93 part of antimony trioxide, and 156 parts of p-carboxyphenylphosphonic acid (in the form of the mono-potassium salt prepared as in Example 2) are introduced into a stainless steel reactor equipped with the usual means of heating, control and regulation.

After several purges, the reactor is placed under a relative pressure of nitrogen of 5 bars.

The temperature is then raised and the water of reaction starts to distill at 245° C.

The temperature is brought to 275° C., whilst the relative pressure is still maintained at 5 bars, over a period of about 2 hours.

The apparatus is then decompressed to atmospheric pressure over a period of 10 minutes, the theoretical amount of water is then obtained, and 510 parts of diethoxylated tetrabromobisphenol A (4 mol %) of the formula:

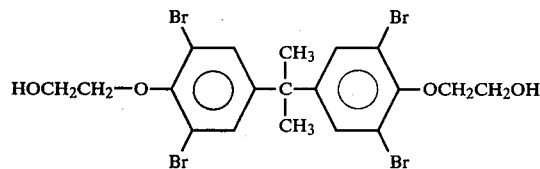

are then added.

When the temperature has returned to 275° C., a vacuum of 1.5 mm Hg is progressively applied over a period of 50 minutes. The polycondensation is carried out at 275° C. for 45 minutes under 0.3 mm of Hg.

The polymer obtained has the following characteristics:

| Viscosity index (V.I.) | 415 |
| --- | --- |
| Viscosity in the molten state at 290° C. | 2,210 poises |
| Softening point | 239° C. |
| Percentage of phosphorus | 0.532–0.533% |
| Percentage of bromine | 5.35–5.40% |

The polymer is spun in the molten state at 270° C. through a spinneret possessing 23 holes of diameter 0.34 mm, and the filaments are then drawn in a ratio of 4.2 X on a heated finger at 85° C., and thereafter on a plate at 120° C.

The threads obtained in this way possess a tenacity of 22 g/tex and an elongation of 15.5%.

Flame-proofing tests on knitted fabric of 80 g/m² of 4 thicknesses:

| former AATCC 34/69 test (with glass thread): | |
|---|---|
| height destroyed | average 10 cm |
| duration | average 10 seconds |
| LOI: | 26.2 |

EXAMPLE 4

3,025 parts of dimethyl terephthalate, 2,080 parts of ethylene glycol, 1.72 parts of manganese acetate, 2.5 parts of sodium acetate, and 0.85 part of antimony trioxide are introduced into a reactor identical to that of Example 2.

The interchange starts at 154° C.; it lasts for 1 hour 30 minutes and the final temperature reaches 218° C.

At 225° C., 4.9 parts of a glycolic solution of phosphorous acid containing 5% of phosphorus are added.

At 230° C., 91.3 parts of paracarboxybenzenephosphonic acid (2.6 mol %) in the form of the mono-sodium salt, prepared by neutralization of paracarboxybenzenephosphonic acid with sodium acetate, and 428.2 parts of tetrabrominated diol of the formula given in Example 3 (4.2 mol %), are added.

At 250° C., a vacuum is applied over a period of 1 hour 10 minutes, and the polycondensation is then carried out at 275° C. under 0.2 mm Hg. After 35 minutes of polycondensation, a polymer is obtained which has the following characteristics:

| Viscosity index (V.I.) | 460 |
|---|---|
| Viscosity in the molten state at 290° C. | 3,640 poises |
| Softening point | 238.5° C. |
| Percentage of phosphorus | 0.426–0.429% |
| Percentage of bromine | 5.48–5.86 |

The polymer obtained in this way is spun at 274° C., and the filaments are wound at 500 m/minute and then drawn in a ratio of 4 X on a finger at 85° C. and a plate at 125° C.

| Gauge per strand | 3.8 dtex |
|---|---|
| Elongation | 14% |
| Tenacity | 16.6 g/tex |
| Flame-proofing tests: | |
| LOI | 32 |
| AATCC: | |
| length destroyed (cm) | 7-12-10 |
| burning drips | 0-0 |

EXAMPLE 5

The reaction is carried out exactly as in Example 4.
Initial charge:

3,066 parts of dimethyl terephthalate, 2,106 parts of glycol, 1.72 parts of manganese acetate, 1.50 parts of sodium acetate, and 0.85 part of antimony trioxide.

The interchange starts at 154° C., and at 218° C. all the methanol, which is formed in the theoretical amount, is distilled.

At 225° C., 4.9 parts of a glycolic solution of phosphorous acid containing 5% of phosphorus are added.

At 230° C., a solution of 79.8 g of paracarboxybenzenephosphonic acid, neutralized with 32.4 g of sodium acetate, in glycol (2.3 mols) and then 428.2 g of diethoxylated tetrabromobisphenol A (4.23 mol %) are added.

At 240° C., 87.5 parts of a 20% strength by weight suspension are introduced over a period of 1 hour 20 minutes.

The polycondensation is carried out for 45 minutes at a temperature of 275° C. under 0.3 mm Hg.

The polymer obtained possesses the following characteristics:

| Viscosity index (V.I.) | 580 |
|---|---|
| Viscosity in the molten state at 290° C. | 5,280 poises |
| Softening point | 246° C. |
| Percentage of phosphorus | 0.344% |
| Percentage of bromine | 5.92% |

The polymer obtained in this way is spun at a temperature of 260° C., and the threads are then wound at a speed of 500 m/minute and drawn in a ratio of 3.4 X on a finger at 80° C. and a plate at 120° C.

The thread exhibits the following characteristics:

| Tenacity | 20 g/tex |
|---|---|
| Elongation | 17% |
| Flame-proofing tests: | |
| LOI | 31.4 |
| AATCC: | |
| Length destroyed (cm) | 7-9-10-9 |
| burning drips | 0-0 |
| Flammability meter LCH: | |
| duration | 45 seconds |
| height (cm) | 19 |
| surface area (cm²) | 26 |
| burning drips | 0 |

EXAMPLE 6

The reaction is carried out exactly according to Example 4, but with the introduction into the charge of 2,723 parts of dimethyl terephthalate, 303 parts of dimethyl isophthalate, 2,080 parts of glycol, 1.72 parts of manganese acetate, 2.5 parts of sodium acetate, and 0.85 part of antimony trioxide, and with the replacement of the sodium salt by the potassium salt (2.5 mol %).

The polyester obtained in this way possesses the following characteristics:

| Viscosity index (V.I.) | 550 |
|---|---|
| Viscosity in the molten state at 290° C. | 4,070 poises |
| Percentage of phosphorus | 0.382% |
| Percentage of bromine | 5.90% |

The polyester prepared in this way is spun through a spinneret, possessing 23 holes of diameter 0.34 mm, maintained at 252° C., and the threads are then wound at 500 m/minute and drawn on a finger at 80° C. and a plate at 120° C. in a ratio of 3.6 X.

Characteristics of the threads:

| Overall gauge | 95 dtex |
|---|---|
| Tenacity | 14 g/tex |
| Elongation | 14.8% |
| Flame-proofing tests: | |
| LOI | 30.9 |
| Flammability meter LCH: | |
| height | 11–13 cm |
| surface area | 68–30 cm² |
| duration | 57–37 seconds |

EXAMPLE 7

A—Preparation of Ca p-carboxyphenylphosphonate 20 parts of p-carboxyphenylphosphonic acid are dissolved in 75 ml of boiling ethylene glycol (duration: 30 minutes), and a glycolic solution containing 1/20th mol of calcium acetate is then added.

B—Preparation of the copolyester 388 parts of dimethyl terephthalate, 310 parts of ethylene glycol, 0.188 part of manganese acetate, 0.093 part of antimony trioxide, and 0.274 part of sodium acetate are introduced into reactor identical to that of Example 1.

The interchange starts at 157° C.

When the temperature reaches 225° C., 70 ppm of phosphorus, in the form of a glycolic solution of phosphorous acid, and the calcium phosphonate solution prepared as in A are added.

A progressively higher vacuum is applied up to 0.3 mm Hg whilst the temperature increases to 275° C. The polycondensation lasts for 40 minutes.

The copolyester obtained in this way possesses the following characteristics:

| | |
|---|---|
| Percentage of phosphorus | 0.4% |
| Viscosity index (V.I.) | 480 |
| Viscosity in the molten state at 290° C. | 2,000 poises |

EXAMPLE 8

The paracarboxybenzenephosphonic acid is prepared in the form of the mono-sodium salt as mentioned above in Example 4.

Preparation of copolyester 41,300 parts by weight of dimethylterephthalate, 28,330 parts by weight of ethylene glycol, 179 ppm of calcium in the form of calcium acetate, 338 ppm of antimony in the form of antimony trioxide, and 150 ppm of sodium in the form of sodium acetate are introduced into a reactor identical to that of Example 1.

The interchange is carried out under normal pressure.

At 225° C., a glycolic solution of phosphorous acid containing 134 ppm of phosphorus is added.

At 230° C., 1,630 parts (0.5% phosphorus) of paracarboxybenzenephosphonic acid in the form of the mono-sodium salt and 7,900 g (8% bromine) of brominated diol of the formula given in Example 1 are added.

Polycondensation is carried out at 270° C.

The copolymer thus obtained, mixed with 25% of a charged polyethyleneterephthalate, and a "control" polyethyleneterephthalate are extruded through a flat spinneret onto a drum, maintained at about 15° C.

Both films are submitted to the former AATCC 34-69 Test (given values represent the mean values obtained from 4 measurements):

| | Height destroyed (cm) | Surface destroyed (cm$^2$) | Combustion duration (sec.) |
|---|---|---|---|
| Ex. 8 | 10 | 32 | 8.25 |
| Reference polyester | 26 | 150 | 58.75 |

What is claimed is:

1. Flame-resistant copolyesters which may be spun and made into a film, characterized in that they consist essentially of from 85 to 96% of repeating units of the formula:

—CO—R—CO—O—R$_1$—O— in which R, derived from acid reactants, is a divalent aromatic paraphenylene or 2,6-naphthylene radical, which may be replaced to the extent of at most 19.5 mol %, relative to the sum of the radicals R, by another aromatic radical selected from the metaphenylene group or by an aliphatic radical comprising from 6 to 12 carbon atoms, or to extent of at most 2 mol % by a trivalent or tetravalent radical, and in which R$_1$ is a divalent aliphatic or cycloalkane radical or a mixture of two or several of these radicals, which may be replaced by at most 2 mol % of a trivalent or tetravalent radical, the sum of the trivalent or tetravalent radicals not exceeding 2 mol %, relative to all of the acid reactants; from 2 to 10% of units of the formula:

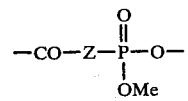

in which Me represents a metal selected from Na, K, Ca or Zn, and Z represents the paraphenylene group or a divalent aliphatic group which contains from 1 to 18 carbon atoms, or a divalent aliphatic group which contains from 1 to 18 carbon atoms and hetero-atoms, and a branched aliphatic group which contains from 1 to 18 carbon atoms, the branch being an aliphatic radical which may be halogenated and having from 1 to 6 carbon atoms; and from 2 to 8% of units produced from a brominated compound of the formula:

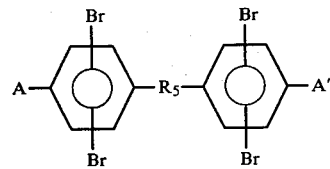

in which R$_5$ is a direct bond or represents a group;

$$-SO_2-, -\underset{\underset{CH_3}{|}}{\overset{\overset{CH_3}{|}}{C}}-, -CH_2- \text{ or } -O-$$

and A and A' represent either —CO—OX groups, where X=H or a lower alkyl group, or —X'OH groups, where X'=a —(OCH$_2$—CH$_2$)$_n$ group, and n=1 to 10.

2. Flame-resistant copolyesters which may be spun and made into a film, said copolyesters consisting essentially of from 85 to 99.5% of repeating units of the formula:

—CO—R—CO—O—R$_1$—O— wherein the R radicals are derived from acid reactants, and in which from 78 to 100% of the R radicals are selected from divalent aromatic paraphenylene and 2,6-naphthylene, from 0 to 20% of the R radicals are selected from metaphenylene groups and aliphatic radicals containing from 6 to 10 carbon atoms, and from 0 to 2% of the R radicals are trivalent or tetravalent radicals derived from branching agents of acid character;

from 98 to 100% of the $R_1$ radicals are selected from divalent aliphatic cycloalkane radicals, or mixtures thereof, and from 0 to 2% of the $R_1$ radicals are trivalent or tetravalent radicals derived from branching agents of alcohol character;

wherein the sum of all of the trivalent and tetravalent radicals does not exceed 2 mol % relative to all of the acid reactants; and at least 0.5% of the units have the formula:

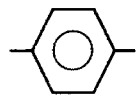

in which Me represents a metal selected from Na, K, Ca or Zn, and Z represents a divalent group selected from paraphenylene, an aliphatic group containing from 1 to 18 carbon atoms, an aliphatic group containing from 1 to 18 carbon atoms and heteroatoms, and a branched aliphatic group containing from 1 to 18 carbon atoms wherein the branching groups contain from 1 to 6 carbon atoms.

3. Flame-resistant copolyesters according to claim 2, characterized in that the group R is the group:

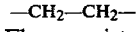

4. Flame-resistant copolyesters according to claim 2 characterized in that the group $R_1$ is the group:
—CH₂—CH₂—

5. Flame-resistant copolyesters according to claim 2, characterized in that the phosphonic unit has the formula:

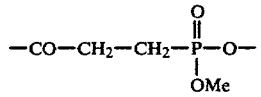

in which Me represents a metal selected from Na, K, Ca or Zn.

6. Flame-resistant copolyesters according to claim 2, characterized in that the phosphonic unit has the formula:

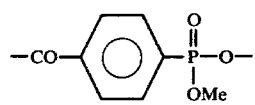

in which Me represents a metal selected from Na, K, Ca or Zn.

7. Flame-resistant copolyesters according to claim 2, characterized in that the phosphonic unit has the formula:

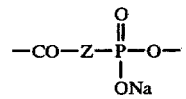

Z having the same meaning as in claim 12.

8. Flame-resistant copolyesters according to claim 2, characterized in that the brominated compound is a diol of the formula:

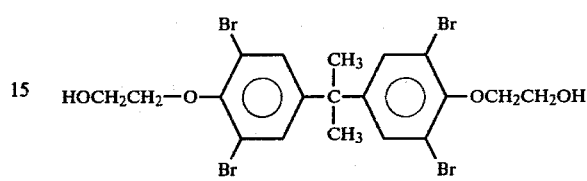

9. Process for obtaining the copolyesters according to claim 2, characterized in that the following are reacted: from 80 to 99.5 mol %, relative to all of the acid reactants, of an aromatic diacid selected from terephthalic acid or 2,6-naphthalenedicarboxylic acid; from 0 to 19.5 mol %, relative to all of the acid reactants, of another aromatic diacid selected from isophthalic acid or of an aliphatic acid comprising from 6 to 12 carbon atoms; from 85.5 to 100 mol % of one or more aliphatic or cycloalkane diols, and, added at any time during the reaction, from 0 to 2 mol %, relative to all of the acid reactants, of a trivalent or tetravalent branching agent of acid or alcohol character, in the presence of a polyester-forming catalyst; at least 0.5 mol % relative to all of the acid reactants, of a product of the general formula:

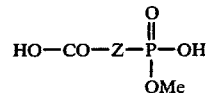

in which Me represents a metal selected from Na, K, Ca or Zn, and Z represents a divalent group selected from paraphenylene, an aliphatic group that contains from 1 to 18 carbon atoms, an aliphatic group that contains from 1 to 18 carbon atoms and hetereo-atoms, and a branched aliphatic group which contains from 1 to 18 carbon atoms wherein the branching groups contain from 1 to 6 carbon atoms; from 0 to 14.5 mol %, relative to all of the acid reactants, of a brominated compound of the general formula:

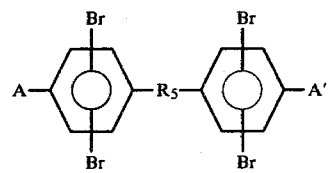

in which $R_5$ is a direct bond or represents a group:

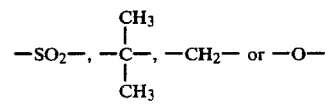

and A and A' are —COOH or —X'OH groups, X' representing a ﹛OCH₂CH₂﹜ₙ group, where n=1 to 10; and wherein the direct esterification process is carried out at a temperature of at least 220° C. under a pressure at least equal to that necessary to maintain the glycol in the liquid state, in the presence of a polyester-forming catalyst.

10. Process for obtaining the copolyesters according to claim 2, characterized in that the following are reacted: from 80 to 99.5 mol %, relative to all of the acid reactants, of a lower alkyl diester of an aromatic diacid selected from terephthalic acid or 2,6-naphthalenedicarboxylic acid; from 0 to 19.5 mol %, relative to all of the acid reactants, of another lower alkyl diester of another aromatic diacid, selected from isophthalic acid, or of an aliphatic diacid comprising from 6 to 12 carbon atoms; from 85.5 to 100 mol %, relative to all of the acid reactants, of one or more aliphatic or cycloalkane diols, with the addition of from 0 to 2 mol %, relative to all of the acid reactants, of a trivalent or tetravalent branching agent of acid, alcohol or ester character; at least 0.5 mol %, relative to all of the acid or ester reactants, of a product of the general formula:

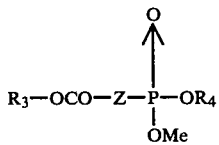

in which Me represents a metal selected from Na, K, Ca or Zn, and Z represents a divalent group selected from paraphenylene, an aliphatic group that contains from 1 to 18 carbon atoms, an aliphatic group that contains from 1 to 18 carbon atoms and heteroatoms, and a branched aliphatic group which contains from 1 to 18 carbon atoms wherein the branching groups contain from 1 to 6 carbon atoms, R₃ and R₄ representing a lower alkyl radical or H; and from 0 to 14.5 mol %, relative to all of the acid or ester reactants, of a brominated compound of the general formula:

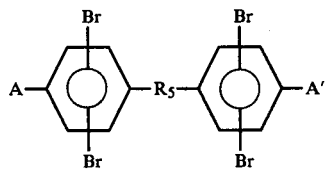

in which R₅ is a direct bond or represents a group:

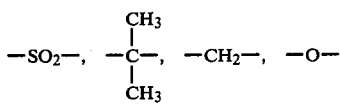

and A and A' are either —CO—OX groups, X representing a lower alkyl, or —X'OH groups, where X'=a ﹛O-CH₂CH₂﹜ group, and n=1 to 10; followed by polycondensation in the usual manner, in the presence of a polyester-forming catalyst, the non-phosphorous-containing ester compounds being added at the start of the interchange, the phosphorus-containing ester compounds being added during the interchange, preferably at the end, the acid compounds being added to the end of the interchange, and the alcohol compounds being added at any time during the reaction;

wherein the interchange of esters is carried out at a temperature of at least 150° C. in the presence of a polyester-forming catalyst, and wherein after addition of the acid and/or diol compounds, the reaction mixture is subjected to a progressively decreasing pressure while temperature is progressively increased to at least 265° C.

11. Flame-resistant shaped articles such as threads, fibers and films, produced from the copolyesters according to claim 2.

12. Flame-resistant copolyesters according to claim 2 wherein up to 14.5% of the repeating units are derived from a brominated compound of the formula

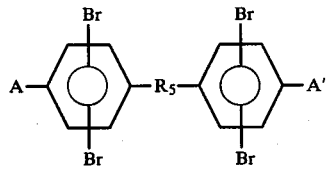

in which R₅ is a direct bond or represents a group:

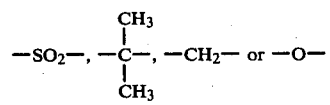

and A and A' represent either —CO—OX groups, where X=H or a lower alkyl group, or —X'OH groups, where X'=a ﹛OCH₂—CH₂﹜ₙ group, and n=1 to 10.

* * * * *